United States Patent [19]

Gallant

[11] Patent Number: 5,317,507
[45] Date of Patent: May 31, 1994

[54] METHOD FOR DOCUMENT RETRIEVAL AND FOR WORD SENSE DISAMBIGUATION USING NEURAL NETWORKS

[76] Inventor: Stephen I. Gallant, 49 Fenno St., Cambridge, Mass. 02138

[21] Appl. No.: 610,430

[22] Filed: Nov. 7, 1990

[51] Int. Cl.$^5$ .............................................. G06F 15/38
[52] U.S. Cl. ............................. 364/419.13; 395/400; 395/600
[58] Field of Search ................. 364/419; 395/400, 600

[56] References Cited

U.S. PATENT DOCUMENTS

| | | | |
|---|---|---|---|
| 4,247,892 | 1/1981 | Lawrence | 364/200 |
| 4,661,924 | 4/1987 | Okamoto et al. | 364/419 |
| 4,864,502 | 9/1989 | Kucera et al. | 364/419 |
| 5,113,340 | 5/1992 | McWherter | 364/419 |

OTHER PUBLICATIONS

"Document Retrieval System based on Nearest Neighbour Searching" by Lucarella, Dario, 1988, Source: Journal of Information Science.
Koll, Matthew, B., "WEIRD: An Approach to Concept-Based Information Retrieval", SGIR Forum Vol. 13, No. 4, Spring 1979.
Wong, S. K. M. et al., "On Modeling of Information Retrieval Concepts in Vector Spaces". ACM Trans. On Database Systems Jun. 1987.
Ossorio, Peter G., "Classification Space: A Multivariate Procedure For Automatic Document Indexing and Retrieval". Multivariate Behavioral Research, Oct. 1966.
Computational Models of Cognition and Perception: Parallel Distributed Processing Explorations in the Microstructure of Cognition vol. 2: Psychological and Biological Models.
Cognitive Science 9, 51–74 (1985) Massively Parallel Parsing: A Strongly Interactive Model of Natural Language Interpretation.
Connectionist Parsing, Garrison W. Wottrell, Department of Computer Science University of Rochester.
Adaptive Information Retrieval: Using a connectionist representation to retrieve and learn about documents, Richard K. Belew.
Indexing by Latent Semantic Analysis, Deerwester, Dumais, Furnas, Landauer, Harshman.
Application of the Interactive Activation Model to Document Retrieval, Bein & Smolensky, University of Colorado at Boulder.

Primary Examiner—Roy N. Envall, Jr.
Assistant Examiner—Gita D. Shingala
Attorney, Agent, or Firm—Robert M. Asher

[57] ABSTRACT

A method for storing and searching documents also useful in disambiguating word senses and a method for generating a dictionary of context vectors. The dictionary of context vectors provides a context vector for each word stem in the dictionary. A context vector is a fixed length list of component values corresponding to a list of word-based features, the component values being an approximate measure of the conceptual relationship between the word stem and the word-based feature. Documents are stored by combining the context vectors of the words remaining in the document after uninteresting words are removed. The summary vector obtained by adding all of the context vectors of the remaining words is normalized. The normalized summary vector is stored for each document. The data base of normalized summary vectors is searched using a query vector and identifying the document whose vector is closest to that query vector. The normalized summary vectors of each document can be stored using cluster trees according to a centroid consistent algorithm to accelerate the searching process. Said searching process also gives an efficient way of finding nearest neighbor vectors in high-dimensional spaces.

23 Claims, 11 Drawing Sheets

METHOD FOR DOCUMENT RETRIEVAL AND FOR WORD SENSE DISAMBIGUATION USING NEURAL NETWORKS

BACKGROUND OF THE INVENTION

The present invention is directed to a method for storing documents that permits meaning sensitive and high speed subject area searching and retrieval. The same method may be used for word sense disambiguation, (e.g., "star" in the sky vs. movie "star").

The most common method of document storage and retrieval involves storing all documents word for word and then searching for key words in the documents using inverted indexes (1). The key word searches are performed by doing a complete search through all of the contents of the data base that contain a list of query words. Such systems have no knowledge that "car" and "automobile" should be counted as the same term, so the user must include this information by a complex and difficult-to-formulate query. Some systems try to solve this problem by a built-in thesaurus, but such systems lack "meaning sensitivity" and miss many obvious facts, for example, that "car" is closer to "road" than to "hippopotamus." It is an object of the present invention to provide a more meaning sensitive method of storage and retrieval that allows simplified queries and reduces the computing capacity required for any particular data base.

There is currently much research and development in the fields of neural networks (2, 3, 4). A neural network consists of a collection of cells and connections between cells, where every connection has an associated positive or negative number called a weight or component value. Cells employ a common rule to compute a unique output, which is then passed along connections to other cells. The particular connections and component values determine the behavior of the network when some specified "input" cells are initialized to a set of values. The component values play roughly the same role in determining neural network behavior as a program does in determining the behavior of a computer.

Waltz and Pollack (5) presented a neural network based model for word sense disambiguation using high level features which are associated with "micro-features". The system was implemented by running several iterations of spreading activation which would be computationally inefficient for medium-or large-scale systems.

Cottrell (6) constructed a similar system as Waltz and Pollack, with the same practical limitations. Belew (7) has also constructed a document retrieval system based upon a "spreading activation" model, but again this system was impractical for medium or large-scale corpora. McClelland and Kawamoto (2) disclosed a sentence parsing method, including word sense disambiguation, using a model with a small number of orothgonal microfeatures.

An important related problem is the following. Given a collection of high-dimensional vectors (e.g. all vectors might have 200 components), find the closest vector to a newly presented vector. Of course all vectors can simply be searched one-by-one, but this takes much time for a large collection. An object of the current invention is to provide a process which makes such searches using much less work.

Although this problem is easily solved for very low dimensional (e.g., 2–4 dimensions) vector by K-D trees (8), K-D trees are useless for high dimensional nearest neighbor problems because they take more time than searching vectors one-by-one.

Prior art for document retrieval is well-summarized by reference (1). Salton's SMART system uses variable length lists of terms as a representation, but there is no meaning sensitivity between terms. Any pair of terms are either synonyms or are not synonyms; the closeness of "car" and "driver" is the same as that of "car" and "hippopotamus".

So called "vector space methods" (1) can capture meaning sensitivity, but they require that the closeness of every pair of terms be known. For a typical full-scale system with over 100,000 terms, this would require about 5,000,000,000 relationships, an impractical amount of information to obtain and store. By contrast the present invention requires only one vector per word, or 100,000 vectors for such a typical full-scale system. This is easily stored, and computation of these vectors can be partly automated.

More recently Deerwester et al. (9) have also proposed a method for searching which uses fixed length vectors. However, their method also requires work on the order of at least the square of the sum of the number of documents and the number of terms. This is impractical for large corpora of documents or terms.

Bein and Smolensky (10) have previously proposed a document retrieval model based upon neural networks that captures some meaning sensitivity. However, a search in their model requires multiplications for twice the product of the number of documents and the number of keywords for each of a plurality of cycles (they report 60). For large corpora, the present invention is expected to make searches up to 10,000 times faster.

SUMMARY OF THE INVENTION

The present invention is directed to a method for document storage and retrieval. The same method is useful for word sense disambiguation.

Document storage according to the present invention is performed by inputting each document in machine readable form into a processing system. Uninteresting words are removed from consideration for the purposes of preparing an easily searchable data base. A context vector assigned to each word remaining in the document is identified from a dictionary of context vectors. A context vector is a fixed length series of component values each representative of a conceptual relationship between a word-based feature and the word to which the vector is assigned. The context vectors are combined for all of the words remaining in the document to obtain a summary vector for that document. The summary vector is normalized so as to produce a normalized summary vector and this normalized summary vector is stored. Thus, the entire document has been reduced to a single normalized summary vector which is used to identify the documents in a data base. Searching for an appropriate document is done through the data base of normalized summary vectors.

In order to further enhance the searching capabilities, a clustering algorithm is used repeatedly for a plurality of levels so as to produce a tree of clustered nodes. A centroid is computed for each node based on the normalized summary vectors assigned to that node by the clustering algorithm. Additional normalized summary vectors are assigned to nodes based on their proximity to the centroids. The bottom level of the tree are a series of buckets each containing the normalized summary vectors as assigned by the clustering algorithm.

Searching is performed by converting an inquiry into a query vector. The query vector is used for identifying the desired documents for retrieval. The query vector is combined with the normalized summary vectors or with the centroids of a node to locate the closest normalized summary vector or group of closest normalized summary vectors. The search is conducted down through the tree taking the branch with the closest centroid. At the bottom level, each normalized summary vector in a bucket is checked to identify the closest one. A depth first tree walk is continued through the entire tree. An entire branch can be eliminated from the search if its centroid fails a test based upon the closest vector found so far and centroids of other nodes. By using the cluster trees, the closest normalized summary vector can be identified quickly without needing to examine every normalized summary vector in the data base.

The method of the present invention can also be used for word sense disambiguation. A series of words surrounding an ambiguous word in a text are input into a processing system in machine readable form. Uninteresting words are removed and a context vector is located for each of the remaining words. The context vectors are combined to obtain a summary vector for the series of words. Ambiguous words have a plurality of context vectors, one context vector for each of the meanings of the ambiguous word. The context vector closest to the summary vector is used to identify the appropriate meaning for the word.

By storing documents in the form of summary vectors in accordance with the present invention, searching for appropriate documents is greatly simplified and matches to queries are improved. The cluster tree employing centroid consistent clustering gives an efficient way of finding nearest neighbor vectors in high-dimensional spaces. This has application in many schemes beyond the document searching embodiment described herein.

Other objects and advantages of the present invention will become apparent during the following description of the presently preferred embodiments of the invention taken in conjunction with the drawings.

DETAILED DESCRIPTION OF THE PREFERRED EMBODIMENTS

Figure 1:
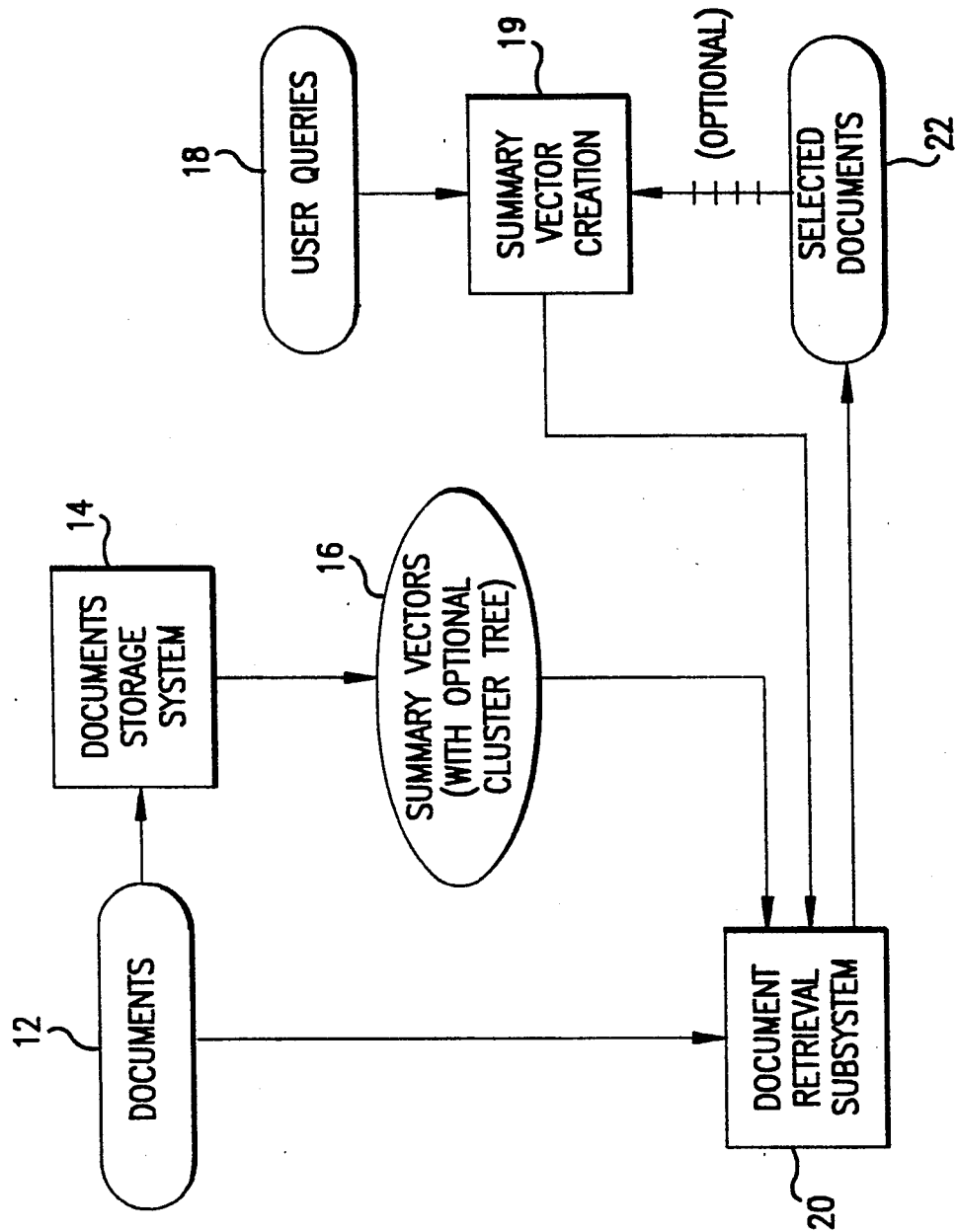
FIG. 1 is a flow chart of the document storage and retrieval system of the present invention.

The document storage and retrieval and word sense disambiguation methods of the present invention are based upon a representation scheme using context vectors. A context vector is a fixed length vector having a component value for each of a plurality of word-based features. For using the methods of the present invention, a set of features that are useful for discriminating words and documents in a particular language and domain are required. A set of sample features are provided in table 1. It is presently recommended that for use in the present invention, context vectors of between 150 and 500 features be used. The number and meaning of the features will be the same for all of the context vectors in a dictionary of context vectors for use in the present invention.

TABLE 1

| human | man | woman | machine | politics |
|---|---|---|---|---|
| art | science | play | sex | entertainment |
| walk | lie-down | motion | speak | yell |
| research | fun | sad | exciting | boring |
| friend | family | baby | country | hot |
| cold | hard | soft | sharp | heavy |
| light | big | small | red | black |
| white | blue | yellow | animal | mammal |
| insect | plant | tree | flower | bush |
| fruit | fragrant | stink | past | present |
| future | hight | low | wood | plastic |
| paper | metal | building | house | factory |
| work | early | late | day | night |
| afternoon | morning | sunny | cloudy | rain |
| snow | hot | cold | humid | bright |
| smart | dumb | car | truck | bike |
| write | type | cook | eat | spicy |
| ... | | | | |

A system can be built once the specified features have been determined. Each word or word stem in a dictionary of words needs to have a context vector defined for it. A context vector is made up of component values each indicative of the conceptual relationship between the word defined by the context vector and the specified features. For simplicity, the values can be restricted to $+2, +1, 0, -1, -2$. A component is given a positive value if its feature is strongly associated with the word. 0 is used if the feature is not associated with the word. A negative value is used to indicate that the word contradicts the feature. As an example, using the features in table 1, the vector for "astronomer" might begin

| < +2 | +1 | +1 | −1 | −1 |
|---|---|---|---|---|
| 0 | +2 | 0 | 0 | 0 |
| 0 | 0 | +1 | +1 | +1 |
| +2 | +1 | −1 | +1 | −1 |
| ... | ... | ... | ... | ... > |

Under such a representation, "car" and "automobile" are expected to be very similar, "car" and "driver" somewhat similar, and "car" and "hippopotamus" uncorrelated. This is the essence of the word-based meaning sensitivity of the current invention, and it extends to document and query representations as discussed below. It is noted that the interpretation of components of context vectors is exactly the same as the interpretation of weights in neural networks.

It would be wasteful to create context vectors for all words. Uninteresting words such as a, an, the, or, for, etc. are removed from the dictionary. Furthermore, only the stem of each remaining word is kept. For example, "investments" becomes "invest". Context vectors are thus only defined for the word stems.

It is contemplated that the dictionary of context vectors could be created by hand. Although, it is expected that such a task would be time consuming, once the task is completed it need not be completed again. Thus, the brute force method may be used in which for each word in the dictionary of context vectors, a component value is manually selected for each feature in the context vector for that word. This is repeated until the context vectors are finished for each of the words in the dictionary. By limiting the dictionary to word stems, much redundant effort can be avoided. Another possibility is to automate much of the task of context vector creation, as described below.

As an option, context vectors may be lengthened to include random features in addition to the word-based features. For a random feature, the component values for each context vector are generated at random. The use of random features in context vectors will assist in keyword recognition. The more random features that are used, the more sensitive the system is to locating an actual search word. The fewer random features that are used, the more meaning-sensitive the system is. For example, without random features, a search for "car" and a search for "automobile" would have very similar results. But using random features, the two words would have vectors that are distinguishable by the random features and the searches would thus be more sensitive to appearance of the words themselves.

Referring now to the drawings, FIG. 1 illustrates the document storage and retrieval system of the present invention using the context vectors. The system is operated by a computer processing system. Documents 12 are entered into the processing system in machine readable form. The document storage subsystem 14 converts the documents into summary vectors 16 based upon the context vectors of the words in the document. The summary vectors 16 are stored for use in response to search requests. The document storage subsystem can be enhanced by arranging the summary vectors in accordance with a cluster tree. User queries 18 are converted to a vector for use by the retrieval system 20 in identifying responsive documents from the data base. A user query 18 may also be augmented by submitting selected documents 22 which are reduced to a summary vector such that the summary vector is then used as the query vector by the retrieval subsystem to obtain other documents similar to the selected documents.

Figure 2:
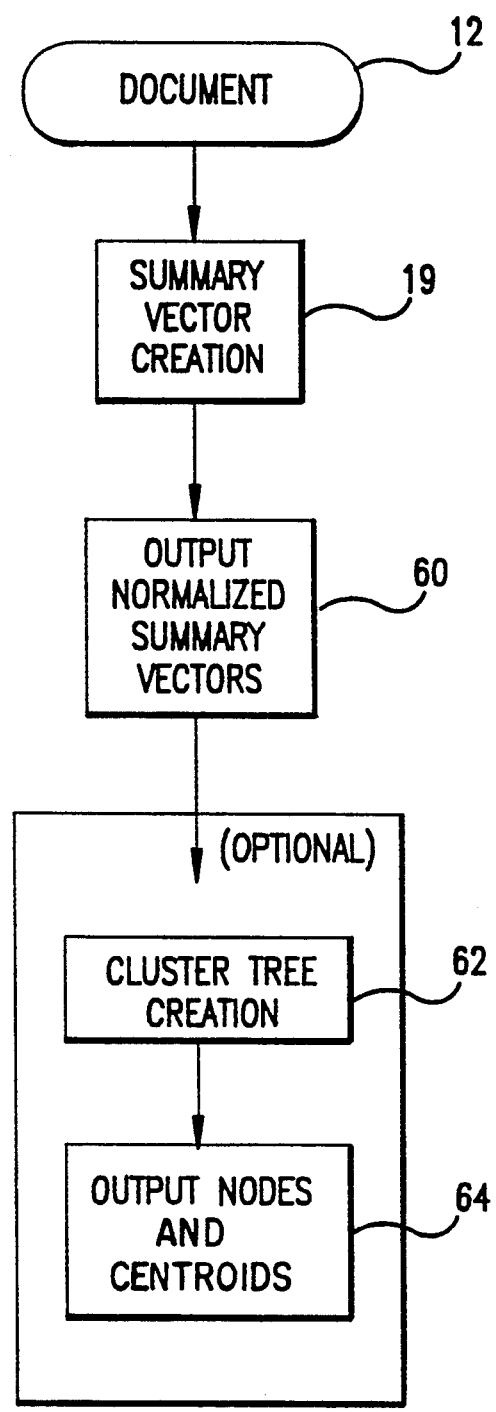
FIG. 2 is a flow chart of the document storage subsystem of FIG. 1.
Figure 3:
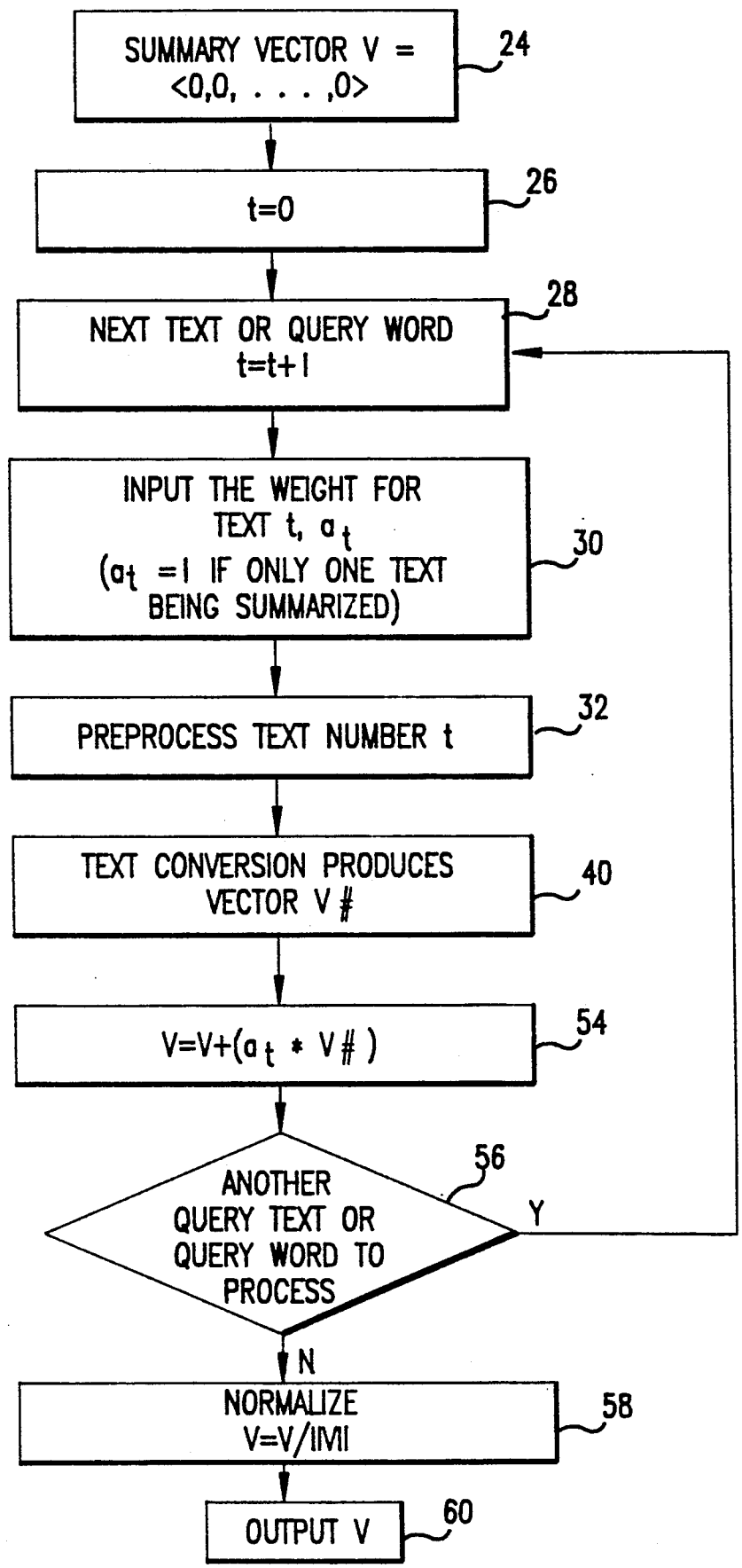
FIG. 3 is a flow chart of summary vector creation used in the document storage subsystem of FIG. 2.

Referring now to the document storage subsystem of FIG. 2 and the summary vector creation method 19 of FIG. 3, a summary vector is generated for each document 12. A summary vector is a fixed length vector having a length equal to the number of features. This is the same length as the context vectors. The same process is performed for each document 12 in determining its summary vector. A summary vector of the fixed length is initiated 24 with all 0 component values. Summary vector creation may be done for a single document or in the case of a query based on a plurality of texts or words, the summary vector is representative of all of the texts or words used in the query. An index t is set 26 to zero and then incremented 28 to count through all of the texts or words used in a query. If several texts and/or words are being used to form a summary vector each of the texts and/or words may be given a different weight 30. When a summary vector is being created for a single document the weighting step is irrelevant. The weight of the single document would be made equal to 1 so that this step has no effect on the processing.

Figure 4:
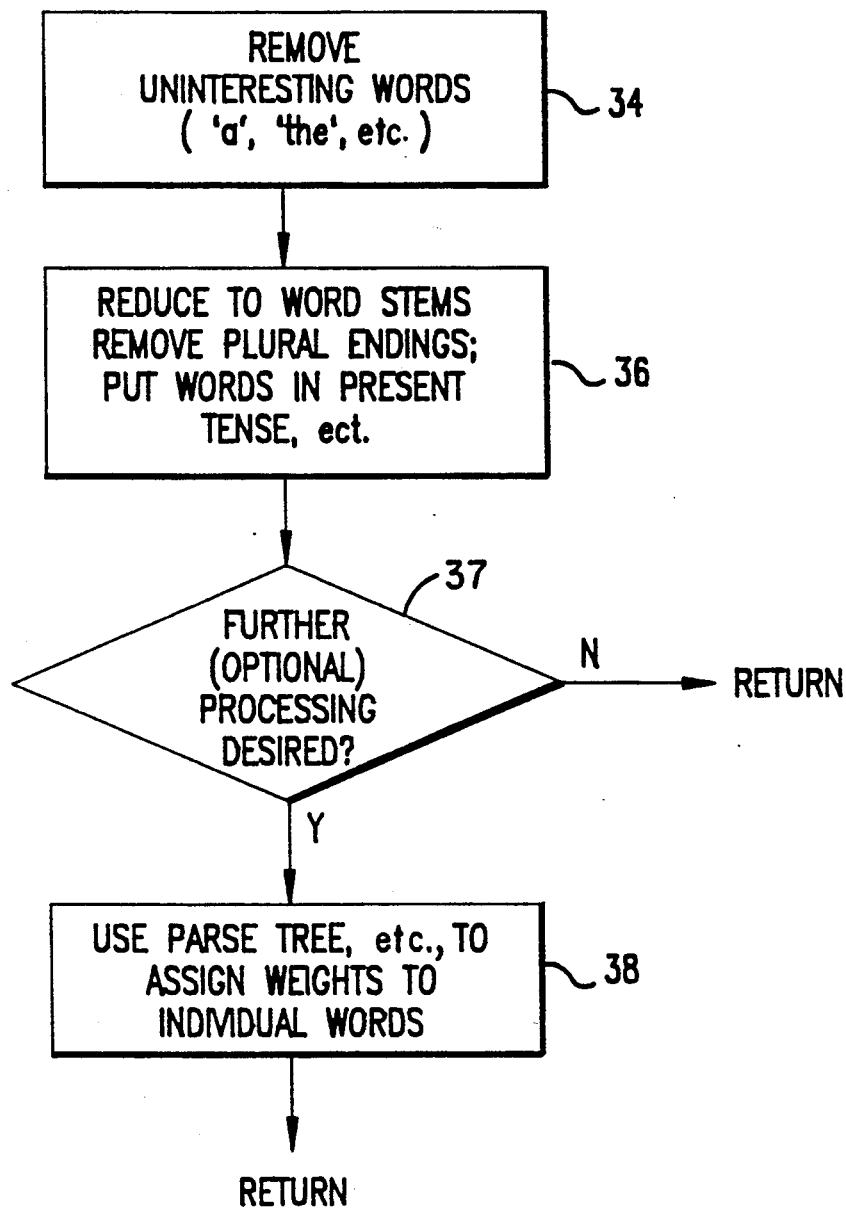
FIG. 4 is a flow chart of text preprocessing for use in the summary vector creation method of FIG. 3.

In order to eliminate uninteresting words such as common function words and in order to find word stems for the remaining words, the document is preprocessed 32 as shown in FIG. 4. Any common uninteresting words such as a, an, the, or, for, etc. are removed from consideration 34. The remaining words are reduced to their stems by stripping off suffixes 36. For example, investments becomes invest. Any well known algorithm for reducing words to their stems may be used. (1)

It may be possible to enhance the accuracy of the searching techniques by using additional processing on the documents. For example, a parsing algorithm can be used to identify the subject, predicate and verb in each sentence. The subject and verb or the subject, verb and predicate can then be assigned 38 a greater weight than the other words in each sentence. Another method is to give the first 100 (or so) words in a document extra weight. Other methods of assigning weights 38 to words in a document may also be used. There are well known algorithms based on the frequency of use of a word in a document or in a series of documents which may be used so as to assign a different weight to each of the remaining words in the document. For example, (1, p. 304) stem s in document d might be weighted by $$(tf(d,s)) (\log( N/df(s) ))$$

where
- $tf(d,s)$ is the number of appearances of stem s in document d;
- N is the total number of documents; and
- $df(s)$ is the number of documents in which stem s appears.

Figure 5:
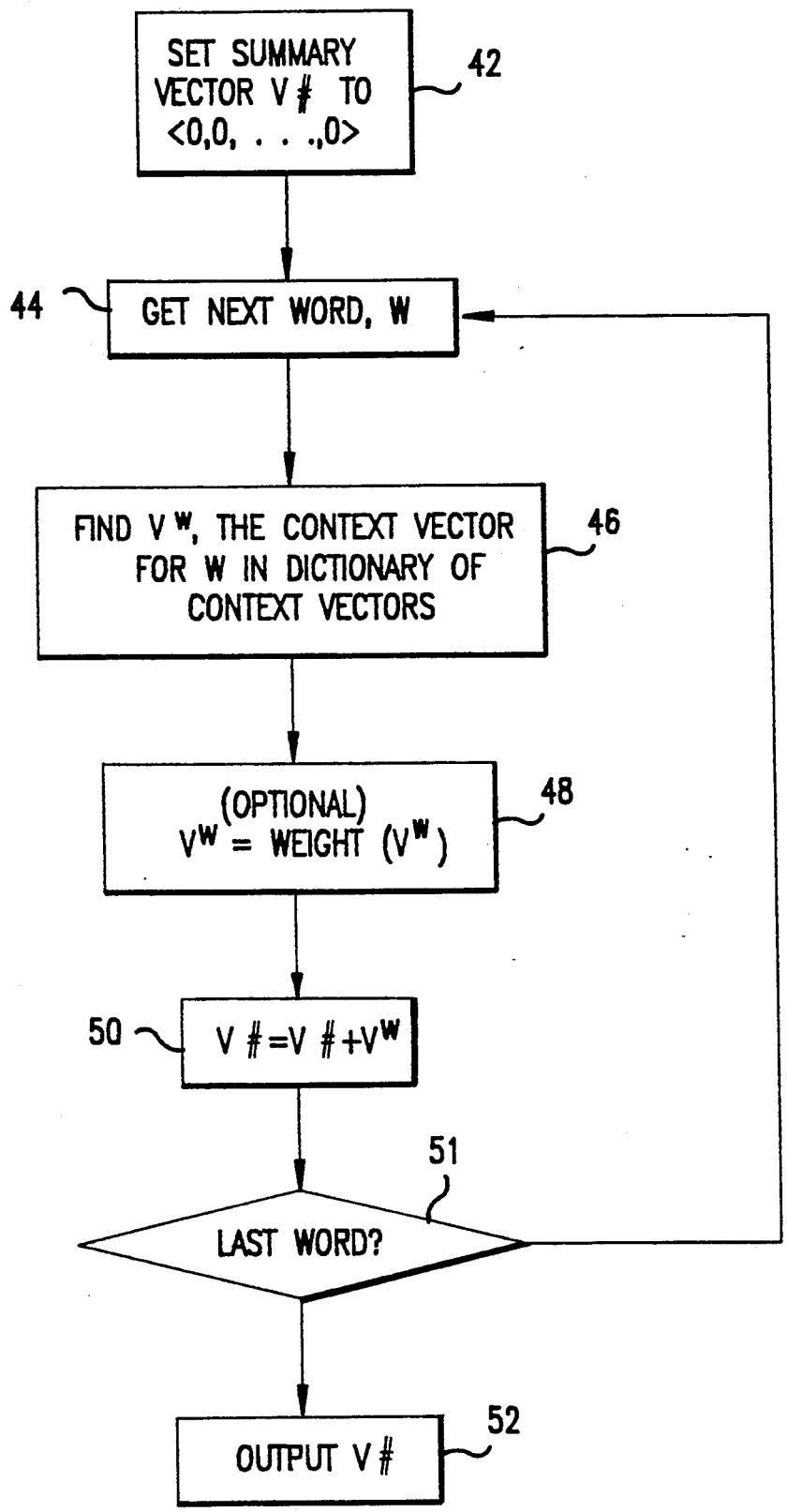
FIG. 5 is a flow chart of a text conversion method for use in the summary vector creation method of FIG. 3.

The preprocessed document may then be converted 40 into vector form as shown in FIG. 5. A summary vector is initialized 42 by setting all component values to 0. Each of the words remaining in the preprocessed text is considered one at a time 44. For each word, its associated context vector is located 46 one at a time in a dictionary of context vectors. The context vector for the word is multiplied 48 by the word's weight if weights were assigned 38 during preprocessing. This multiplication step 48 when used, produces weighted context vectors. The context vector or weighted context vector, as the case by be, is added 50 to the summary vector being formed for the document. For each feature in the vectors, the component value from the context vector of the word is added to the component value for the summary vector being formed. This results in a new summary vector for use with the next word in the document. After the context vectors for all of the remaining words to be considered in the document have been added, a gross summary vector 52 for the document is obtained.

Returning now to FIG. 3, if a summary vector is being determined for a plurality of documents in a query, the gross summary vector obtained from a summation process can be multiplied by a weight and added to the summary query vector being formed 54. Summary vector creation may then take place for the next document 56 being used to form the query. When all the documents being used in the formation of the summary vectors have been processed, the gross summary vector is completed.

The gross summary vector from the summation process is normalized 58. Normalization is performed by dividing each component value in the vector by the absolute magnitude of the vector. The magnitude of the vector is determined by taking the square root of the square of all of the component values in the vector. This results in a normalized summary vector. By providing normalized summary vectors, each document is given an equal weighting in a data base in which they are stored. The normalized summary vector is output 60 for storage. Thus, a data base is collected with a normalized summary vector for each document in the data base. Searches can be quickly conducted through the use of the normalized summary vector data base rather than requiring the exhaustive search through the entire contents of all the documents.

Figure 6:
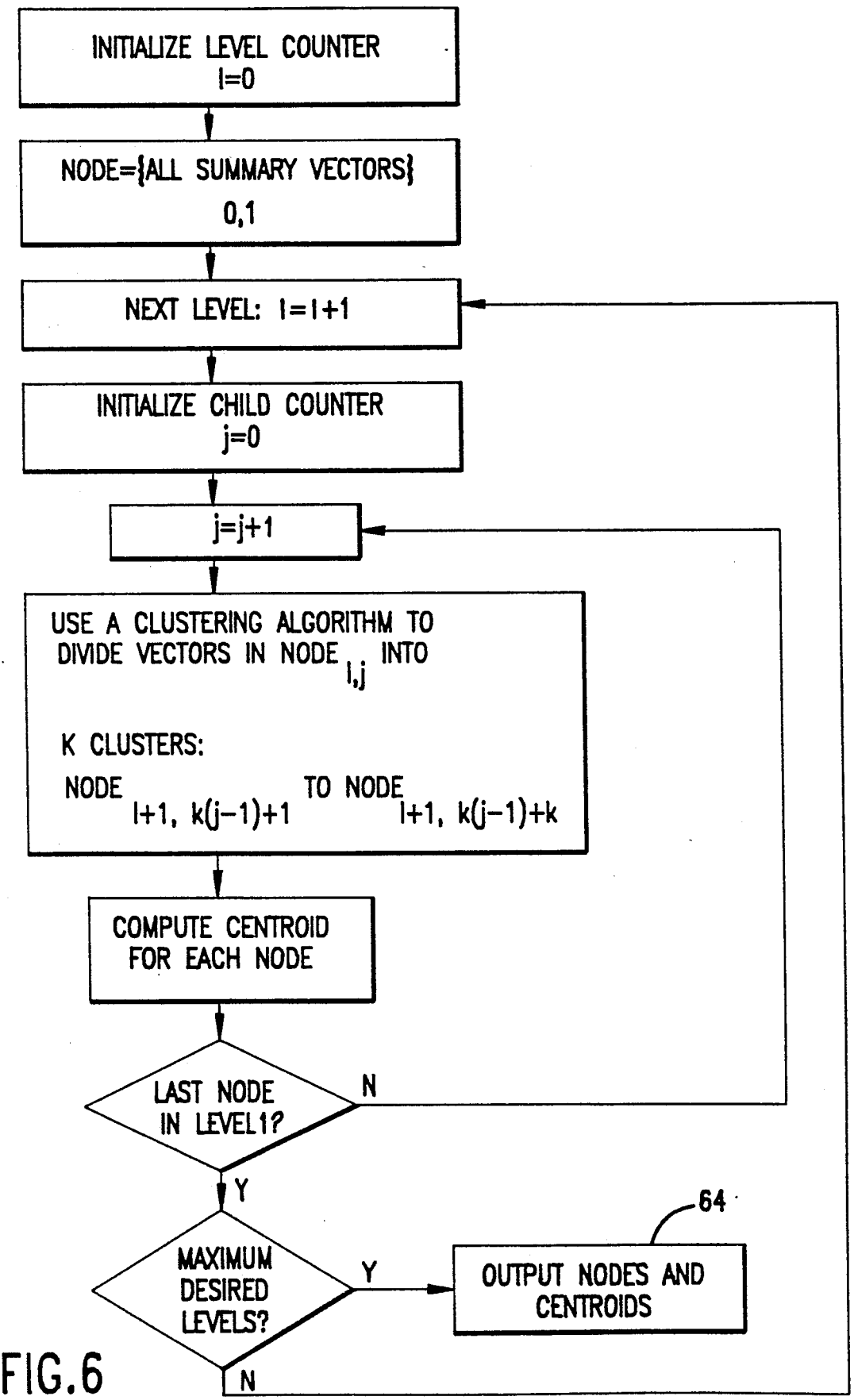
FIG. 6 is a flow chart of cluster tree creation for use in the document storage subsystem of FIG. 2.

As shown in FIG. 2, the storage of the normalized summary vectors can be arranged to further reduce searching time by creating cluster trees. Cluster tree formation 62 is described in greater detail with respect to FIG. 6. An initial parent node at the top of the tree indexed as level 0, node 1, contains all of the normalized summary vectors in the data base. A series of child nodes each branching from the initial parent node is created at a next level of the cluster tree. A centroid consistent clustering algorithm is used to divide the summary vectors among the series of nodes. A group of clusters is centroid consistent if every member of every cluster belongs to the cluster in the group with the closest centroid. A centroid is determined by taking, for each feature, the average of the component values from all of the context vectors in the group. One popular centroid consistent clustering algorithm is convergent k-means clustering. (11) Convergent k-means clustering can be performed as follows:

1. Begin with any initial partition that groups the vectors into k clusters. For example, take the first k summary vectors as single element clusters. Assign each of the remaining summary vectors with the cluster nearest centroid. After each assignment, recompute the centroid for the cluster which gains a vector;

2. Take each summary vector in sequence and compute its distance from the centroid of each of the k-clusters. If the vector is not currently in the cluster with the closest centroid switch the vector to that cluster and update the centroids of the clusters which gain or lose a summary vector;

3. Repeat step 2 until convergence is achieved, that is until a pass through all of the summary vectors causes no new assignments.

Since convergence may be rather time consuming to achieve, the clustering algorithm can be simplified by limiting the number of iterations through the algorithm. After say, 99 iterations of the algorithm, the centroids can be frozen. Then one more pass can be made through all of the summary vectors distributing the vectors to appropriate clusters, but without updating the centroids. While, using this approximation, the centroids will no longer be exact centroids, the approximate centroids will be sufficient for the use of the present invention. It is not necessary to the present invention that the centroids be precise but rather that the clusters be centroid consistent. The last pass through the summary vectors guarantees that the clusters are centroid consistent with the approximate centroids. From herein, "centroids" as used in this application shall mean approximate centroids. In other words, a centroid sufficient to establish centroid consistent clusters. Each node is identified by its centroid for use in the searching process.

In forming a next level of clusters, the nodes in the level above become parent nodes to a set of child nodes below. Only the summary vectors assigned to a parent node are used in the clustering algorithm to form the child nodes which branch from that parent. This is repeated across the entire level of parent nodes and on subsequent levels so that fewer and fewer context vectors are assigned to the child nodes on each lower level. The nodes form a tree pattern in which each node branches from a node in the level above. Thus, each summary vector is assigned to a node on each level of the cluster tree. Each node has a centroid. The bottom-level node assignments for each summary vector and the centroids for each node are stored for use in the search and retrieval algorithms. on the bottom level of the tree, each node points to each normalized summary vector assigned to it. The nodes on the bottom level may be referred to as buckets.

Once a cluster tree has been set up, it is a simple matter to add a new document summary vector to the tree. The initial branches of the tree are examined for the closest centroid. The summary vector is assigned to the node with the closest centroid. Then the branches from that node are examined for the closest child node centroid, and the process is continued until a bucket is reached. The new document is then assigned to the bucket with the closest centroid of those buckets branching from the node on the previous level to which the summary vector was assigned. The centroids themselves are not changed. This action preserves centroid consistency of the clusters. If a bucket gets too big, the summary vectors on the bucket can be divided into sub clusters on a subsequent level.

Figure 7:
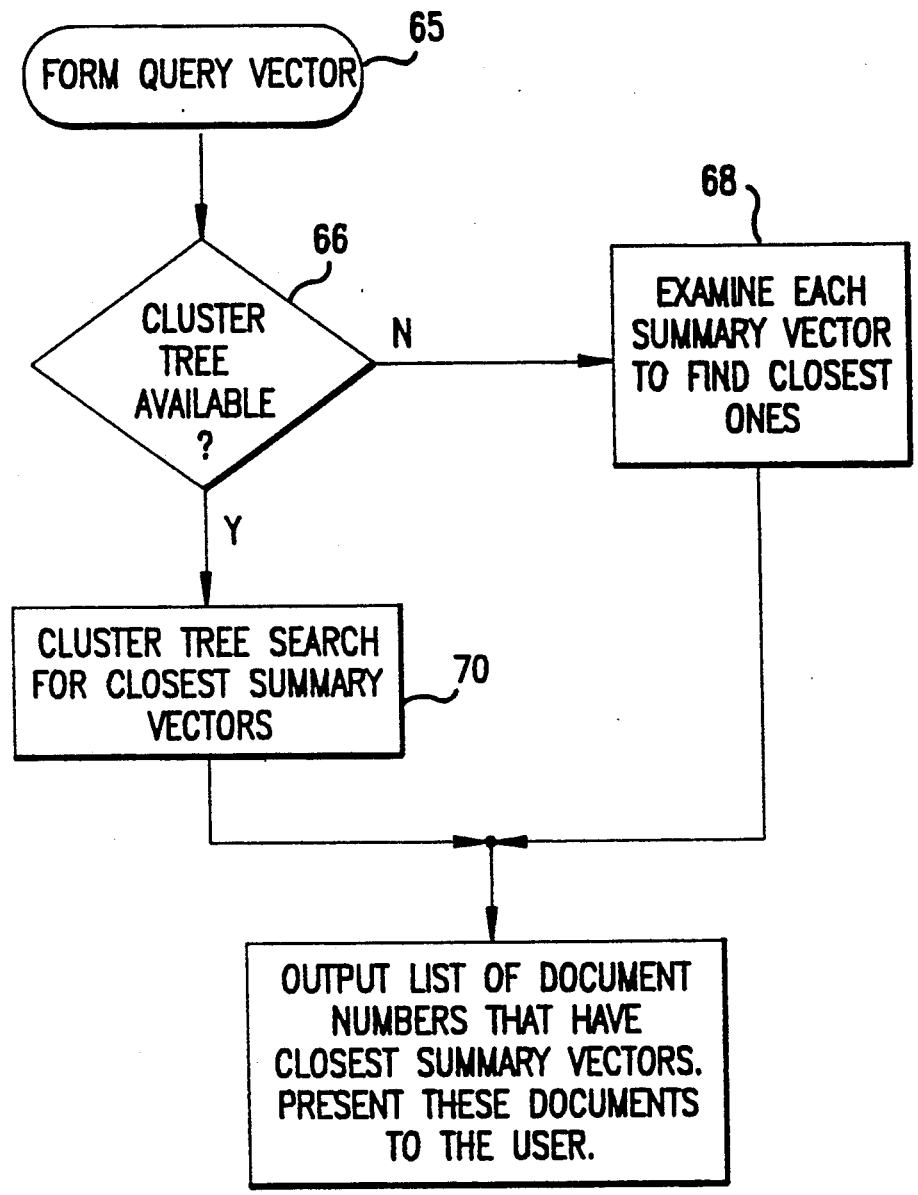
FIG. 7 is a flow chart of the document retrieval subsystem of FIG. 1.

Having stored all of the documents as summary vectors in a data base, we now turn to the document retrieval system of FIG. 7. An inquiry can be made using a set of words or terms or by submitting one or more documents for which similar documents are sought or a mixture of documents and words. Weights may be assigned for each of the terms or documents in a query where such terms or documents are considered to be more or less pertinent to the results sought in the search. In order to treat a term comprised of several words with the same weight as a single key word, the context vectors of the words comprising the term are added together and then normalized to produce a single normalized context vector for the term. The query vector is obtained by weighting and summing the summary vectors of the query words and texts as described above with respect to FIG. 3. It is not necessary to normalize 58 the query vector.

If the summary vectors in the data base are stored without the benefit of cluster trees 66, the query vector is compared with each summary vector in the data base in a brute force manner to identify the summary vector which is closest 68 to the query vector. The relative distance between a query vector and a summary vector can be determined by multiplying the query vector by a summary vector. Multiplication is performed by multiplying the component values for each feature together and summing the results. The result obtained can be compared with the magnitudes of the product vectors obtained with each of the summary vectors. The product vector with the maximum magnitude identifies the closest summary vector to the query vector. Alternatively, the relative distance between the summary vectors and a query vector can be determined by subtracting the query vector from each of the summary vectors. The magnitude of the difference vectors may then be used to identify the closest summary vector to the query vector. However, in this case it is the difference vector with the minimum magnitude which is the closest summary vector.

By using the cluster tree storage mechanism of the present invention, the searching task can be greatly accelerated. Searching through a cluster tree 70 for the closest summary vector to a query vector is described with respect to FIGS. 8 and 9. The query vector is used in the search routine of FIG. 9 to identify the summary vector that is closest to the query vector. The search is performed using a depth first tree walk. A branch is followed down the tree taking the node at each level having the centroid closest to the query vector. The search proceeds down the tree until a bottom level node (bucket) without children is reached 76. Each of the summary vectors in the bucket is compared with the query vector to identify the closest summary vector 78. The closest summary vector V is remembered and updated if during the search a closer summary vector is identified.

Before a subsequent node in the depth first tree walk is checked for a closest vector, first it is determined whether the node can be completely pruned. A node is pruned if it is not possible for a closer normalized summary vector to be assigned to the node than the closest normalized summary vector found so far without violating centroid consistency. Suppose we are examining a node with centroid C' for pruning. If C is the centroid of any sibling node then if it is true that any vector closer to the query vector Q than V (closest vector found so far) must be closer to C than C', then we may prune the node with centroid C' as well as any nodes branching therefrom. This may be computed by comparing 82 the distance between C and C' with twice the sum of the distance between C and Q and the distance between Q and V. If the distance between C and C' is greater, then the node with centroid C' (and descendents) may be pruned. If not, the formula is repeated for the remaining sibling nodes since any one of them may permit pruning to proceed. If none of the sibling nodes achieve pruning of the node, then the search continues through the node with centroid C' and down into the subsequent level if there is one. By using the pruning formula 82, a node can be pruned when any vector closer to the query vector than the closest vector V must be closer to the centroid C than to the centroid C'. Therefore, that vector could not be assigned to node C or else it would violate centroid consistency. If this is a bottom node, then all of the summary vectors on the node must be checked 78 to determine whether any are closer than the closest vector found so far. If a closer summary vector is found, it will then become the closest summary vector 80 being remembered. Thus, bottom nodes are thoroughly searched if not pruned. The search continues in a depth first tree walk pruning off entire branches when possible. These searches continue through the tree until all branches have either been checked or pruned. After the entire tree has been searched, the closest summary vector has been identified. The document associated with the summary vector can be retrieved.

The pruning formula given above provides for rough pruning of the tree. Greater pruning can be accomplished if more work is put into the pruning algorithm. When the simple pruning algorithm fails it may be desirable to use linear programming to attempt to prune the path. This would require additional computational time but it may be worthwhile for pruning a high level branch.

For a linear programming approach, we seek to find out whether the following set of constraints has a feasible solution. Suppose we are considering node N for pruning and V is the closest vector found so far. We check whether any vector V* can exist that satisfies:

1. For each node $N^1$ in the tree path from the initial parent node to N, it must be that V* is closer to the centroid for $N^1$ than to the centroid for any other sibling node of $N^1$; and 2. The distance between $V^Q$ and V* is less than the distance between $V^Q$ and V.

These constraints can be formulated as a linear programming problem by one skilled in that art. If such problem is found to be infeasible (i.e., admit no solution) then node N and descendents may be pruned.

Figure 8:
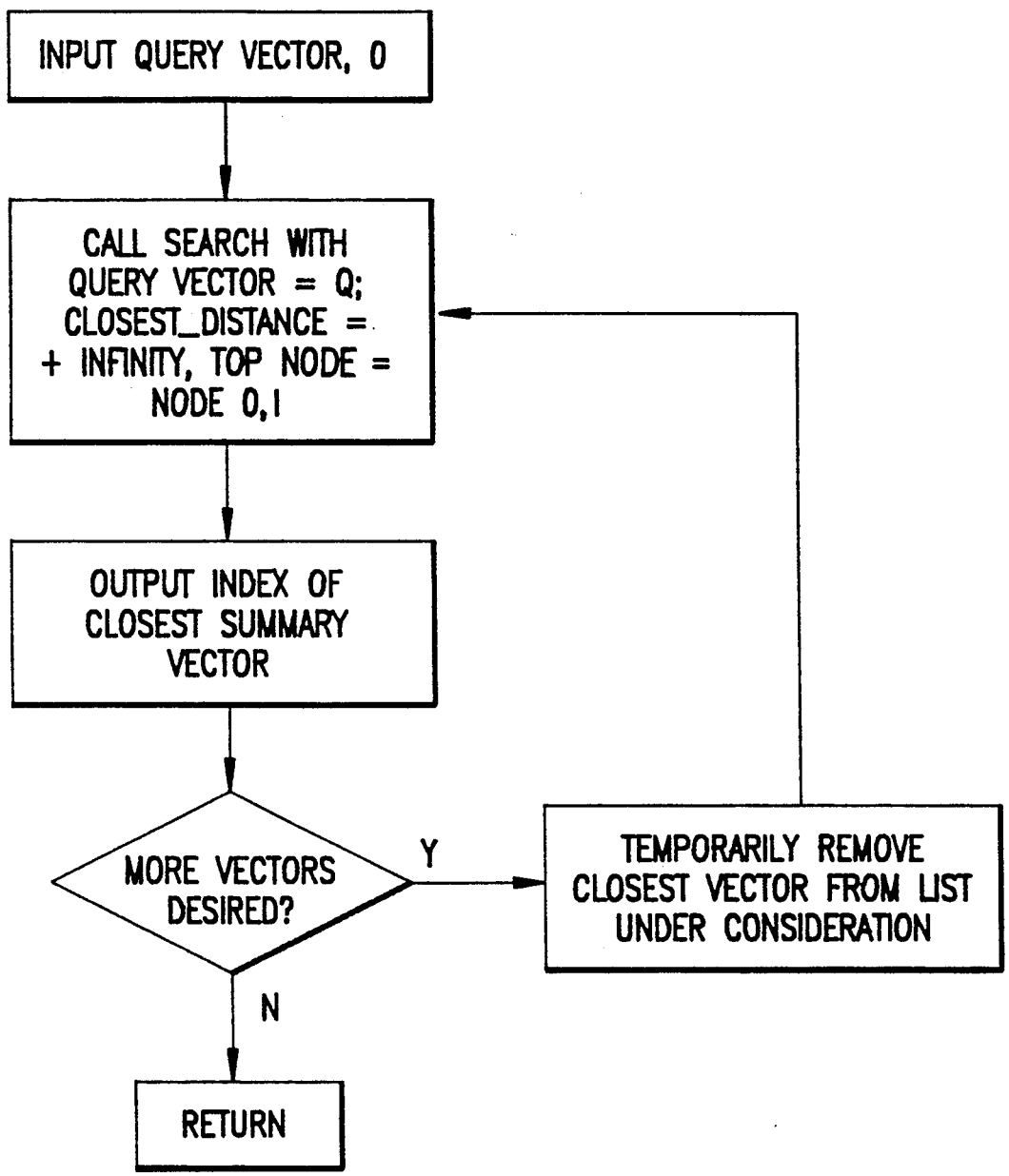
FIG. 8 is a flow chart of a cluster tree search for use in the document retrieval system of FIG. 7.
Figure 9:
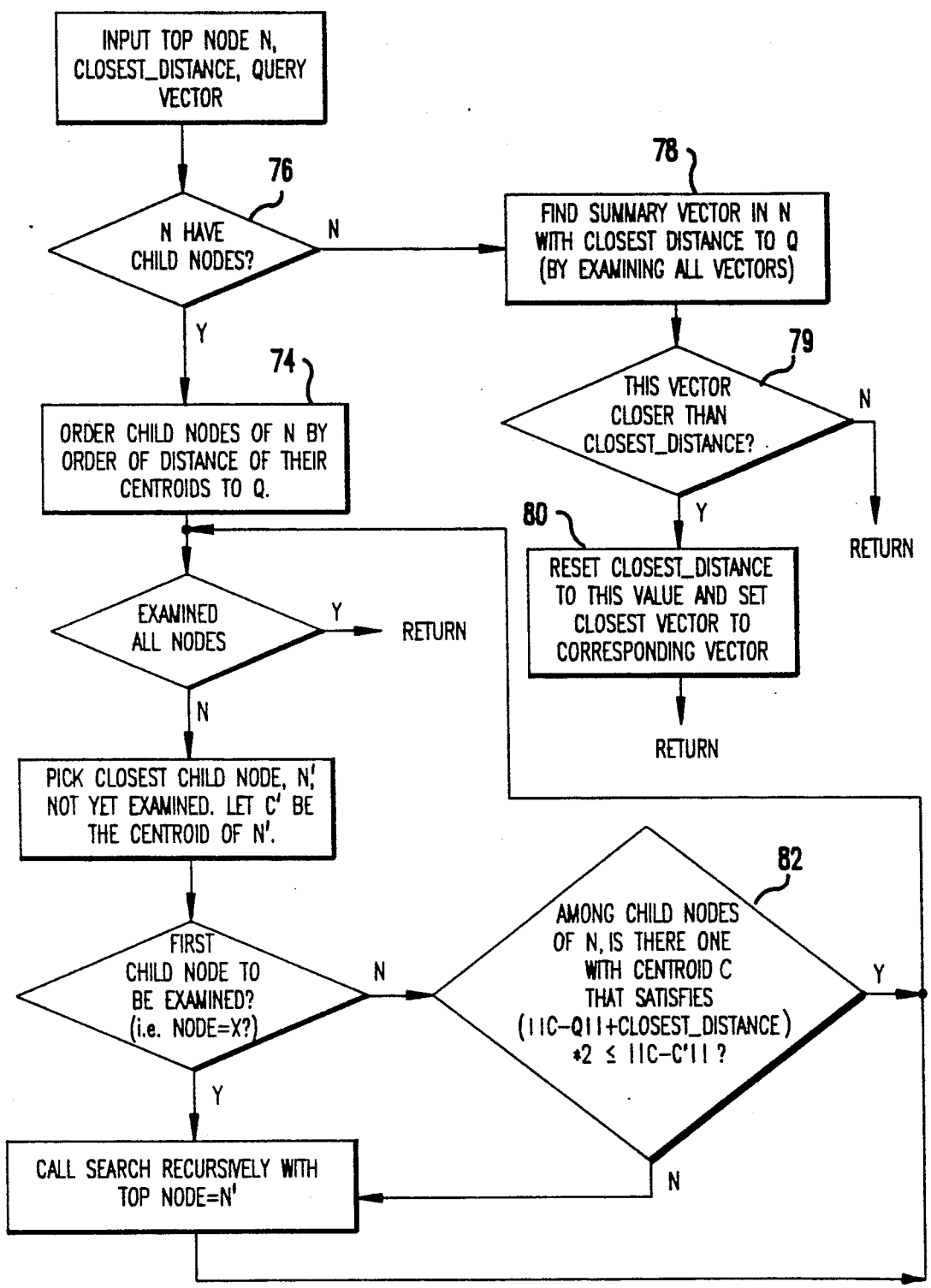
FIG. 9 is a flow chart of a search subroutine for use in the cluster tree search of FIG. 8.

As shown in FIG. 8, after the closest summary vector is found, it may be removed from consideration and the search repeated to find the next closest summary vector. This process may be repeated for as many summary vectors as are required.

Figure 10:
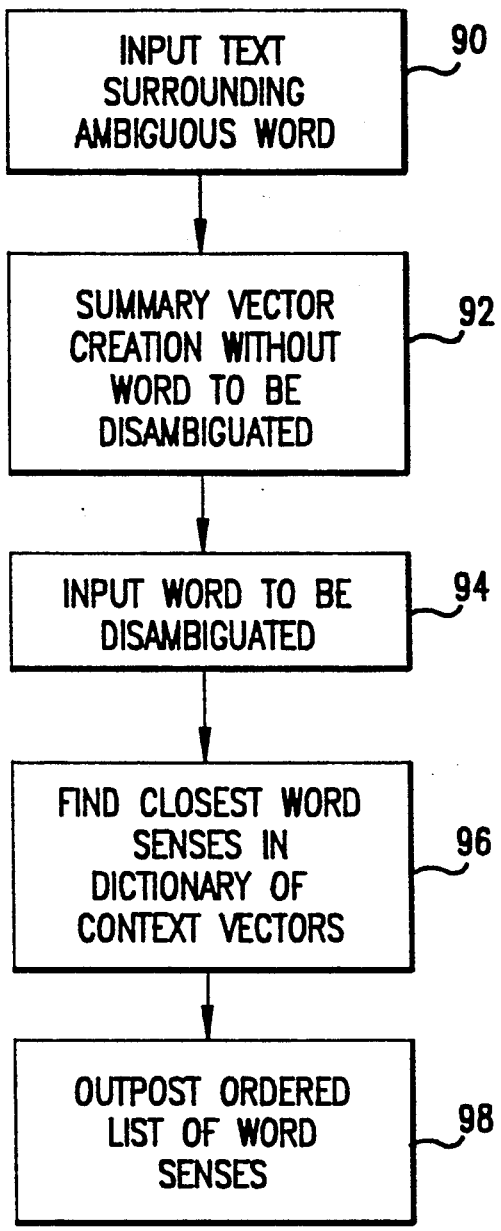
FIG. 10 is a flow chart for word sense disambiguation using the summary vector creation method of FIG. 3.

Referring now to FIG. 10, the present invention is shown for use in achieving word sense disambiguation. The text surrounding an ambiguous word is input into 90 the processing system. A summary vector is then created 92 for the text surrounding the ambiguous word. Summary vector creation was described with reference to FIG. 3. Weights may be assigned to each of the words in the series of words. One weighting mechanism would be to give the greatest weight to words which are closest to the ambiguous word in the text. Uninteresting words are removed from the series and the remaining words except for the ambiguous word are located in the dictionary of context vectors. The context vector for each of the remaining words is multiplied by its weight so as to produce a weighted context vector for each of the remaining words. For each of the remaining words being considered in the text surrounding the ambiguous word, the weighted context vectors are summed together. The sum of all of the weighted context vectors is the summary vector for the series of words. The normalization step is not necessary for word sense disambiguations.

The word being disambiguated is then considered 94. The dictionary of context vectors contains a different context vector for each of the different meanings which could be applied to the ambiguous word. The plurality of context vectors associated with the ambiguous word are retrieved from the dictionary of context vectors. The summary vector obtained from the surrounding text is then compared 96 with each of the context vectors associated with the ambiguous word. The relative distances between the summary vector and each of the context vectors can be determined by multiplying the vectors together or from subtracting the vectors from each other. The context vector which is determined to be closest to the summary vector of the surrounding text is identified as the appropriate meaning for the ambiguous word. If there are more than two possible meanings for the word, these can be ordered 98 according to their relative closeness to the summary vector for the surrounding text. The appropriate meaning can be output for the processing system.

The foundation for the workings for the present invention is the dictionary of context vectors. At least part of the data base needs to be entered by hand. For each of the features making up all the features of the context vector an integer should be entered according to how that feature correlates, suggests and is consistent with the word stem for which the context vector is being formed. For example, a scale of from $-5$ to $+5$ may be used. It may be further advantageous to normalize the context vectors in the dictionary so that the average squared weight is the same for each feature. Alternatively, normalization may be performed for each word so that the average squared weight is the same for each word in the dictionary. The creation of context vectors will be a time consuming task but fortunately it only needs to be performed once. Due to the subtleties of human experience, it is preferred that at least a core group of words have their context vectors entered by humans.

Figure 11:
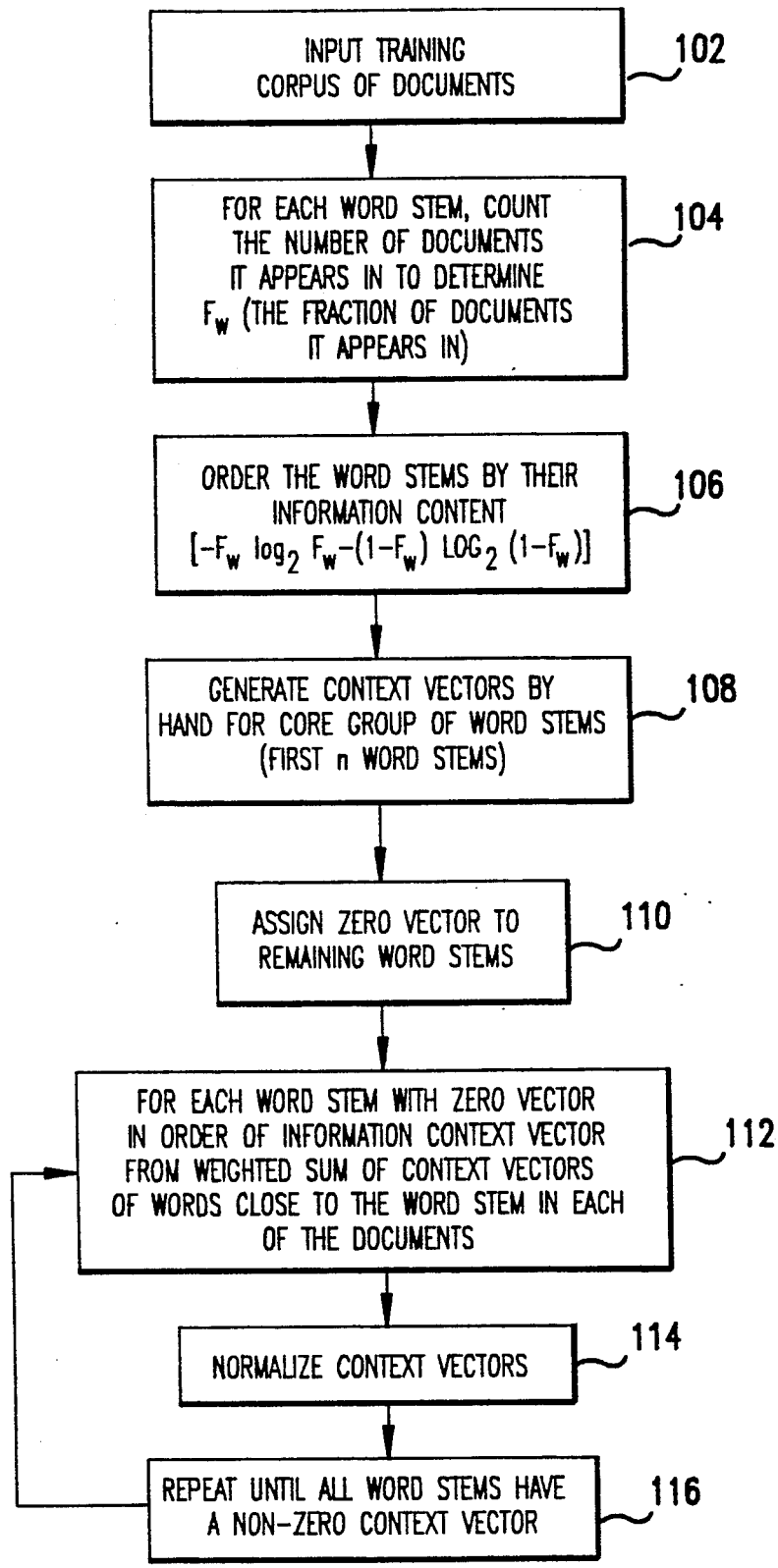
FIG. 11 is a flow chart for the creation of a dictionary of context vectors for use in the present invention.

An automated method for building a dictionary of context vectors can be achieved with the aid of a training corpus 102, i.e., an initial set of documents, as shown in FIG. 11. For each word stem, the number of documents which the word stem appears in are counted 104. We let $F_w$ be the fraction of training corpus documents in which the word stem w appears. All of the word stems are then ordered 106 by their information content which is defined by the equation:

$$-F_w \log_2 F_w - (1 - F_w) \log_2 (1 - F_w).$$

It is seen from this equation that words appearing in half of the documents have the highest information content while those appearing in either all or none of the documents have the lowest content.

A core group of word stems having the highest information content are taken from the top of the list. For example, the first 1,000 word stems having the highest information content may be selected. For this core group of word stems, context vectors are generated by hand 108. Temporarily a 0 vector is assigned to any other word stems remaining 110. The word stem w which has temporarily been assigned a 0 vector having the highest information content is then taken. For this word stem, the context vectors of word stems that are close to w in the training corpus documents are weighted by their distance from w. For example, the 10 stems preceding and following each occurence the word stem may be used. The weighted context vectors are added up to produce a context vector for the word stem 112. The context vector can then be normalized 114. The resulting context vector becomes w's permanent context vector. The next word stem w having the highest information content from those word stems which have only a temporary 0 vector is then selected and the process is repeated 116. It is recommended that at least 1000 documents be used. Once the dictionary of context vectors is completed, the invention may be used to its full benefit. For such dictionary building, multiple meanings of a word do not enter in; all stems have only one context vector.

Of course, it should be understood that various changes and modifications to the preferred embodiments described above will be apparent to those skilled in the art. For example, numerous weighting schemes, parsing algorithms, clustering algorithms or methods for creating a context vector dictionary are possible within the scope of the present invention. These and other changes can be made without departing from the spirit and scope of the invention and without diminishing its attendant advantages. It is therefore intended that such changes and modifications be covered by the following claims.

APPENDIX (1) Salton, G. Automatic text processing: The transformation, analysis, and retrieval of information by computer. Reading Mass.: Addison-Wesley, 1989.

(2) Rumelhart, D. E. & McClelland, J. L. (Eds.) Parallel Distributed Processing: Explorations in the Microstructures of Cognition, Vol. 1 and Vol. 2, MIT Press 1986.

(3) Anderson, J. A. and Rosenfeld, E. (eds). Neurocomputing, A reader, MIT Press, 1988.

(4) Hecht-Nielson, Neurocomputing. Reading Ma.: Addison-Wesley, 1990.

(5) Waltz, D. L. & Pollack, J., Massively Parallel Parsing: A Strongly Interactive Model of Natural Language Interpretation. Cognitive Science 9, 51-74 (1985).

(6) Cottrell, G. W. Connectionist Parsing, Seventh Annual Conference of the Cognitive Science society, Irvine, Calif.

(7) Belew, R. K., Adaptive Information Retrieval. 12th International Conference on Research & Development in Information Retrieval. Boston, June, 1989.

(8) Samet, H. The Design and Analysis of Spatial Data Structures. Reading, Mass.: Addison-Wesley Publishing Company, 1990.

(9) Deerwester, S., Dumais, S. T., Furnas, G. W., Landauer, T. K., Harshman,, R. Indexing by Latent Semantic Analysis, Journal of the American Society for Info. Science, 41(b):391-407, 1990.

(10) Bein, J. & Smolensky, P. (1988). Application of the interactive activation model to document retrieval. Proceedings of Neuro-Nimes 1988: Neural networks and their applications. Nimes, France, November 395-308.

(11) MacQueen, J. B. Some Methods for Classification and Analysis of Multivariate Observations. Proc. Symp. Math. Statist. and Probability, 5th, Berkeley, 1, 281-297, AD 669871, University of California Press, Berkeley.

I claim:

1. A method for storing a searchable representation of a document comprising the steps of:
   inputting a document containing a series of words in machine readable form into a processing system;
   removing from consideration any words in said series of words that are also found in a predetermined list of uninteresting words;
   locating in a dictionary of context vectors a context vector for each word remaining in said series of words, each context vector providing for each of a plurality of word-based features, a component value representative of a conceptual relationship between said word and said word-based feature;
   combining the context vectors for each word remaining in said series of words to obtain a summary vector for said document;
   normalizing said summary vector to produce a normalized summary vector; and
   storing said normalized summary vector.

2. The method of claim 1 wherein said step of combining the context vectors comprises summing the context vectors.

3. The method of claim 1 further comprising assigning weights to each of the words remaining in said series of words and wherein said step of combining the context vectors comprises multiplying the context vector for each remaining word by the weight assigned to said word to produce a weighted context vector for each remaining word and summing the weighted context vectors for each remaining word to obtain said summary vector for said document.

4. The method of claim 3 wherein words in a beginning portion of said document are given more weight than other words in said document.

5. The method of claim 3 further comprising parsing sentences in said document to identify subjects and verbs of a sentence and wherein said subjects and verbs are given more weight than other words in said sentence.

6. The method of claim 1 further comprising the step of standardizing the words remaining in said series of words by replacing a plurality of said words each with a word stem corresponding to the word being replaced.

7. The method of claim 1 wherein each context vector has additional component values selected at random.

8. A method for generating a searchable representation of a query comprising the steps of:
inputting a query comprising a plurality of query words or texts, each text containing a series of words in machine readable form, into a processing system;
assigning a weight to each query word or text;
for each query word or text, locating a context vector or normalized summary vector, respectively, each of said vectors providing for each of a plurality of word-based features a component value representative of a conceptual relationship between said query word or text and said word-based feature;
multiplying the vector of each query word or text by the weight assigned to said query word or text to produce a weighted context vector for each query word and a weighted summary vector for each text; and
summing the weighted contect vectors and weighted summary of said plurality of query words and texts to generate a summary for said query.

9. The method of claim 8 wherein each of said vectors includes additional component values determined through random selection.

10. A method for cataloging searchable representations of a plurality of documents comprising the steps of
(a) generating a normalized summary vector for each document of said plurality of documents to create a corresponding plurality of normalized summary vectors;
(b) assigning each of said normalized summary vectors to one of a plurality of nodes in accordance with a centroid consistent clustering algorithm;
(c) calculating a centroid for each of said nodes;
(d) repeating steps (b) and (c) for the normalized summary vectors on one or more of said nodes to create a tree of nodes.

11. The method of claim 10 further comprising the step of repeating said step (d) to add additional levels to said tree of nodes.

12. The method of claim 10 wherein said step of generating a normalized summary vector comprises:
inputting said each document containing a series of words in machine readable form into a processing system;
removing from consideration any words in said series of words that are also found in a predetermined list of uninteresting words;
locating in a dictionary of context vectors a context vector for each word remaining in said series of words, each context vector providing for each of a plurality of word-based features a component value representative of a conceptual relationship between said word and said word-based feature;
combining the context vectors for each word remaining in said series of words to obtain a summary vector for said each document; and
normalizing said summary vector to produce a normalized summary vector corresponding to said each document.

13. A document cataloging and retrieval method comprising the steps of:
inputting a plurality of documents in machine readable form into a processing system;
generating a normalized summary vector for each document of said plurality of documents to create a corresponding plurality of normalized summary vectors;
assigning each of said normalized summary vectors in said plurality of normalized summary vectors to one of a plurality of nodes in accordance with a centroid consistent clustering algorithm;
for a plurality of said nodes, assigning each of the normalized summary vectors assigned to said node to one of a plurality of nodes on a subsequent level in accordance with a centroid consistent clustering algorithm and repeating this step for nodes on subsequent levels to form a cluster tree of nodes, each node characterized by an approximate centroid;
forming a query vector;
searching said tree of nodes for a normalized summary vector which is closest to said query vector by conducting a depth first tree walk through said tree of nodes and pruning a node and any nodes branching therefrom if, upon comparing the approximate centroid of said node with said query vector and the approximate centroid of another node branching from the same node that said node branches from, it is not possible for a closer normalized summary vector to be on said node than the closest normalized summary vector found so far without violating centroid consistency; and
retrieving the document corresponding to the normalized summary vector obtained after searching or pruning all nodes on said tree.

14. A method for locating on a cluster tree the closest vector to a query vector comprising the steps of:
providing a cluster tree for a plurality of vectors, said tree having a parent node to which all of the vectors in said plurality of vectors are assigned and subsequent levels each with a plurality of nodes branching from a node on a previous level, each node including a subset of the vectors from the node it branches from characterized by an approximate centroid wherein the vectors on a node of a subsequent level are each closer to the approximate centroid of its node than to the approximate centroid of any other node on said subsequent level branching from the same node;
forming a query vector;

searching said cluster tree of nodes for a normalized summary vector which is closest to said query vector by conducting a depth first tree walk talking the node branching from a parent having the closest approximate centroid of all the other nodes branching from the parent and pruning a node and any nodes branching therefrom if it is not possible for a closer normalized summary vector to be on said node than the closest normalized summary vector found so far without violating centroid consistency and;

identifying the closest normalized summary vector obtained from said searching.

15. The method of claim 14 further comprising the step of adding a summary vector to said cluster tree by assigning said summary vector to the parent node having an approximate centroid closer to the summary vector than any other parent node and then assigning said summary vector to the node branching from said parent node on each subsequent level that has an approximate centroid closer to the summary vector than any other node on said subsequent level and branching from the same node on a previous level to which the vector has already been assigned.

16. A word sense disambiguation method comprising the steps of:
   inputting into a processing system in machine readable form a series of words including and surrounding an ambiguous word in a text;
   removing from consideration any words in said series of words that are also found in a predetermined list of uninteresting words;
   locating in a dictionary of context vectors a context vector for each word remaining in said series of words;
   combining the context vectors for each remaining word to obtain a summary vector for said series of words;
   locating a plurality of context vectors in said dictionary of context vectors corresponding to a plurality of meanings for said ambiguous word; and
   combining said summary vector with each of said context vectors associated with said ambiguous word to obtain a relative distance between each of said context vectors and said summary vector, said relative distances serving as a measure of the relative appropriateness of each of said meanings.

17. The word sense disambiguation method of claim 16 further comprising the steps of assigning a weight to each word remaining in said series of words and multiplying the context vector for each of said remaining words by the weight assigned to said each word to produce a weighted context vector for said each remaining word and wherein said step of combining comprises summing the weighted context vectors.

18. The word sense disambiguation method of claim 16 further comprising determining a most appropriate meaning for said ambiguous word based upon said relative distances and outputting said most appropriate meaning.

19. The word sense disambiguation method of claim 16 further comprising outputting the meanings of said ambiguous word in order of the relative distances determined for the corresponding context vectors.

20. A method for generating a dictionary of context vectors comprising:
   providing a corpus of documents, each document including a series of words;
   creating a list of all of said words in said corpus of documents;
   inputting component values to generate context vectors for a core group of words;
   temporarily assigning a zero context vector to the words on said list not included in said core group;
   for each word with a zero vector in order of appearance on said list, combining the context vectors for words appearing close to said word within each of the series of words in said documents to generate a context vector for said word.

21. The method of claim 20 wherein said step of combining comprises assigning weights to the words in said series of words appearing close to said word based on relative closeness, multiplying the context vectors of said words in said series of words by said weights to form weighted context vectors and summing said weighted context vectors.

22. The method of claim 21 further comprising normalizing said sum of weighted context vectors.

23. The method of claim 20 further comprising the steps of:
   counting the number of documents each word is found in;
   using said count to determine an information content for each word; and
   selecting the core group of words from the words having the highest information content.

* * * * *

UNITED STATES PATENT AND TRADEMARK OFFICE
CERTIFICATE OF CORRECTION

PATENT NO. : 5,317,507
DATED : May 31, 1994
INVENTOR(S) : Stephen I. Gallant

It is certified that error appears in the above-indentified patent and that said Letters Patent is hereby corrected as shown below:

```
column 13, line 46    "summary of said plurality" should be --
                      summary vectors of said plurality--
column 13, line 47    "to generate a summary for said query"
                      should be --to generate a summary vector
                      for said query--
column 13, line 52    "comprising the steps of" should be --
                      comprising the steps of:--
column 15, line 3     "talking" should be --taking--
```

Signed and Sealed this

Twenty-seventh Day of December, 1994

Attest:

BRUCE LEHMAN

*Attesting Officer*     *Commissioner of Patents and Trademarks*